United States Patent
Takeda

(10) Patent No.: US 9,573,273 B2
(45) Date of Patent: Feb. 21, 2017

(54) ROBOT SIMULATION DEVICE FOR GENERATING MOTION PATH OF ROBOT

(71) Applicant: FANUC CORPORATION, Minamitsuru-gun, Yamanashi (JP)

(72) Inventor: Toshiya Takeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 25 days.

(21) Appl. No.: 14/629,728

(22) Filed: Feb. 24, 2015

(65) Prior Publication Data
US 2015/0239121 A1 Aug. 27, 2015

(30) Foreign Application Priority Data
Feb. 27, 2014 (JP) ................. 2014-036814

(51) Int. Cl.
  *B25J 9/16* (2006.01)
  *G06N 99/00* (2010.01)
  *G06N 7/00* (2006.01)

(52) U.S. Cl.
  CPC ........... *B25J 9/1605* (2013.01); *G06N 7/00* (2013.01); *G06N 99/005* (2013.01); *Y10S 901/03* (2013.01)

(58) Field of Classification Search
  CPC ........ B25J 9/1605; G06N 7/00; G06N 99/005; Y10S 901/03
  See application file for complete search history.

(56) References Cited

U.S. PATENT DOCUMENTS

| | | | |
|---|---|---|---|
| 5,798,627 A | 8/1998 | Gilliland | |
| 6,463,358 B1 * | 10/2002 | Watanabe | B25J 9/1674 318/14 |
| 8,290,620 B2 | 10/2012 | Yoshizawa | |

FOREIGN PATENT DOCUMENTS

| | | |
|---|---|---|
| CN | 1382565 | 12/2002 |
| JP | 07141016 | 6/1995 |
| JP | 10333746 | 12/1998 |
| JP | 2000-020117 | 1/2000 |
| JP | 2003-091303 A | 3/2003 |
| JP | 2004243461 | 9/2004 |
| JP | 2005149016 | 6/2005 |
| JP | 2007316942 | 12/2007 |
| JP | 2008269021 | 11/2008 |
| JP | 2009166172 | 7/2009 |
| JP | 2012056063 | 3/2012 |

(Continued)

*Primary Examiner* — Yuen Wong
(74) *Attorney, Agent, or Firm* — RatnerPrestia

(57) ABSTRACT

A robot simulation device for automatically generating a practical interference avoiding motion path, regardless of the level of skill of an operator. The device includes: a motion path obtaining part which obtains a first motion path by simulating a robot motion program; a teaching point specifying part which detects whether a robot interferes with a peripheral object on the first path, and specifies first and second teaching points immediately before and after the interference occurs, respectively; a motion path generating part which automatically inserts a third teaching point between the first and second points and generates second motion paths for avoiding the interference, based on a search direction and distance determined by a random number; an evaluating part which evaluates each second path based on a predetermined parameter; and a motion path selecting part which selects an optimum motion path from the second paths based on an evaluation result.

8 Claims, 4 Drawing Sheets

(56) References Cited

FOREIGN PATENT DOCUMENTS

| | | |
|---|---|---|
| JP | 2012056064 | 3/2012 |
| JP | 2012076196 | 4/2012 |
| JP | 2012157965 | 8/2012 |
| WO | 9824011 | 6/1998 |
| WO | 2013140236 | 9/2013 |

\* cited by examiner

ROBOT SIMULATION DEVICE FOR GENERATING MOTION PATH OF ROBOT

BACKGROUND OF THE INVENTION

1. Field of the Invention

The preset invention relates to a robot simulation device for executing simulation of a robot, and in particular, relates to a simulation device for generating a motion path by which the robot can be prevented from interfering with peripheral equipment.

2. Description of the Related Art

In the prior art, a simulation device has been proposed, wherein a motion path of a robot is generated so that the robot can carry out a predetermined operation while avoiding interference with peripheral equipment. For example, JP 2003-091303 A discloses a method and a device for automatically setting a narrow area motion path along for pulling an end effector of a multi-joint robot from a working point on a workpiece, and a wide area motion path for moving between the working points.

Further, JP 2000-020117 A discloses a method and a device for planning a motion path of a multi-joint manipulator (robot), wherein an orientation path of a robot hand is calculated by using a potential field method.

The potential method as described in JP 2000-020117 is a known algorithm used to generate a robot path, etc. Concretely, in the method, the space where the robot is operated is divided into grids, and the energy of each grid is determined so that a grid where an obstacle exists has high energy, and energy of the grid is lowered as the obstacle moves away from. Then, by moving the robot from the current position to a grid having low energy, a path, by which the robot can avoid interference with the obstacle, is generated.

However, in general, when a complicated motion path (or a path for avoiding interference) is calculated by using the potential method, calculation for generating the path may be trapped in an endless loop, or an optimum solution may not be obtained due to a local solution. In such a case, an operator must change a calculation condition or adjust a generated motion path, which is cumbersome and requires a high level of skill.

SUMMARY OF THE INVENTION

Therefore, an object of the present invention is to provide a robot simulation system capable of automatically generating a practical motion path of a robot for avoiding interference, regardless of the level of skill of an operator.

According to the present invention, there is provided a robot simulation device for carrying out a simulation of a robot by positioning three-dimensional models of the robot and a peripheral object arranged about the robot in the same virtual space, the robot simulation device comprising: a motion path obtaining part which obtains a first motion path of the robot by executing a simulation of a motion program of the robot; a teaching point specifying part which detects whether interference between the robot and the peripheral object occurs when the robot is moved along the first motion path, and specifies a first teaching point corresponding to a teaching point immediately before the interference occurs and a second teaching point corresponding to a teaching point immediately after the interference occurs; a motion path generating part which automatically adds at least one third teaching point between the first and second teaching points and generates different second motion paths by which the interference between the robot and the peripheral object does not occur, the third teaching point being separated from the first or second teaching point in a search direction determined by a random number by a search distance determined by a random number; an evaluating part which evaluates each of the second motion paths based on at least one previously determined parameter; and a motion path selecting part which selects an optimum motion path of the robot from the second motion paths based on an evaluation result by the evaluating part.

In a preferred embodiment, the motion path generating part data detects whether the interference between the robot and the peripheral object occurs when the robot is moved along a motion path from the first teaching point to one intermediate teaching point separated from the first teaching point in a search direction determined by a random number by a search distance determined by a random number, and inserts the intermediate teaching point between the first and second teaching points when the interference does not occur; and wherein the motion path generating part detects whether the interference between the robot and the peripheral object occurs when the robot is moved along a motion path from the lastly inserted intermediate teaching point to the second teaching point, and generates the second motion path by repeating a process for inserting a newly one intermediate teaching point separated from the lastly inserted intermediate teaching point in a search direction determined by a random number by a search distance determined by a random number, until the interference does not occur.

In this case, the motion path generating part may have at least one of functions to: set an initial state in which a probability that a random number for determining the search direction, by which a distance between the intermediate teaching point and the second teaching point is smaller than a distance between the first teaching point and the second teaching point, is selected, is higher than a probability that a random number for determining the search direction, by which the distance between the intermediate teaching point and the second teaching point is larger than the distance between the first teaching point and the second teaching point, is selected; and detect whether the interference between the robot and the peripheral object occurs in the motion path from the first teaching point to the intermediate teaching point, and make a setting in which a probability that a search direction by which the interference does not occur is selected in a next or later searching is higher than a probability that a search direction by which the interference occurs is selected in the next or later searching.

Further, in this case, the robot simulation device may further comprise a teaching point deleting part which deletes a surplus teaching point from the third teaching point, wherein the teaching point deleting part may have at least one of functions to: store a movement direction and a movement distance of each of the inserted third teaching points, and, when the movement directions of two consecutive third teaching points on the second motion path are the same, then combine the two consecutive third teaching points into one new teaching point by adding the movement distances of the two consecutive third teaching points; when movement directions of two consecutive third teaching points on the second motion path are opposed to each other, combine the two consecutive third teaching points into one new teaching point or delete the two consecutive third teaching points by canceling the movement distances of the two consecutive third teaching points each other; and detect whether the interference between the robot and the peripheral object in relation to a path connecting two arbitrary inconsecutive third teaching points on the second motion path, and, when the interference does not occur, delete a teaching point between the two arbitrary inconsecutive third teaching points.

In a preferred embodiment, the at least one parameter includes: (a) a motion time of the robot; (b) a minimum distance between the robot and the peripheral object; (c) an amount of heat generation of a motor for driving the robot; (d) a lifetime of a speed reducer of the robot; and (e) a consumed power of the robot, and wherein the evaluating part selects a plurality of arbitrary parameters from the parameters (a) to (e) in relation to the second motion path and each third teaching point included in the second motion path, and calculates an evaluation value by previously weighting the selected parameters.

In a preferred embodiment, the robot simulation device further comprises a teaching point adjusting part which adjusts the position of the third teaching point, wherein the teaching point adjusting part is configured to: evaluate each third teaching point included in the second motion path based on at least one predetermined parameter; repeatedly carry out a process for moving the position of the third teaching point to be adjusted by a small distance within a predetermined acceptable range and detecting whether the interference between the robot and the peripheral object occurs; and set a third teaching point having the highest evaluation mark among the third teaching points within the predetermined acceptable range as an adjusted position of the third teaching point.

In a preferred embodiment, the teaching point generating part is configured to: generate a first relay point in the vicinity of the first teaching point, where the robot does not interfere with the peripheral object even when the robot is moved by a predetermined distance in any direction; generate a second relay point in the vicinity of the second teaching point, where the robot does not interfere with the peripheral object even when the robot is moved by a predetermined distance in any direction; and generate motion paths between the first teaching point and the first relay point, between the first relay point and the second relay point, and between the second relay point and the second teaching point, respectively, by which the robot does not interfere with the peripheral object.

In a preferred embodiment, the motion path generating part is configured to: generate a plurality of blocks by dividing a plurality of teaching points included in the first motion path at a position where the interference between the robot and the peripheral object occurs; change an order of at least two of the blocks and/or reverse an order of the teaching points included in each block; and automatically generate a motion path between the last teaching point in the block and a leading teaching point in the subsequent block, by which the robot does not interfere with the peripheral object.

In a preferred embodiment, the robot simulation device is incorporated in a controller for controlling an actual robot.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
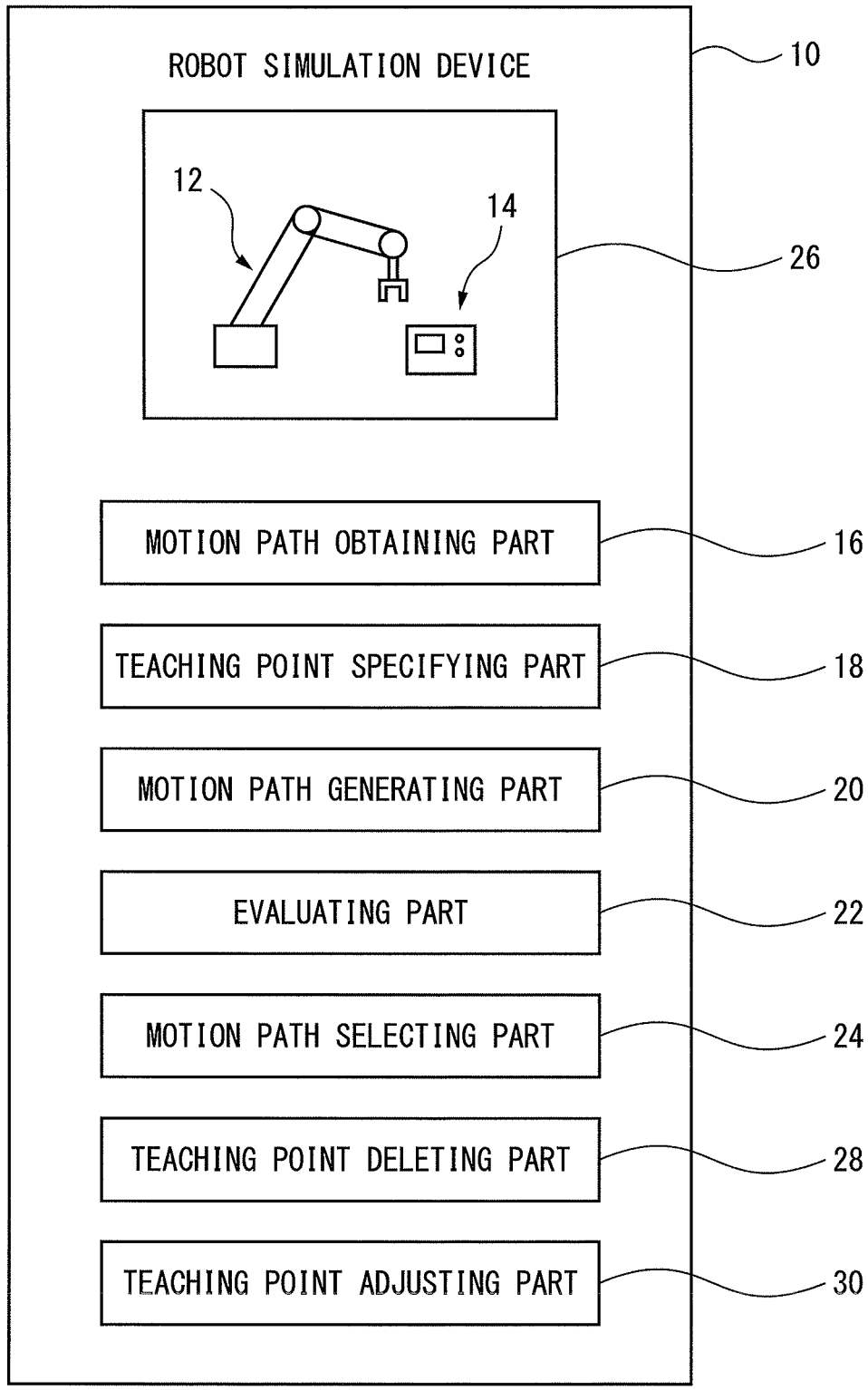
FIG. 1 is a functional block diagram of a robot simulation device according to an embodiment of the present invention.

FIG. 1 is a functional block diagram of a robot simulation device (hereinafter, also referred to as merely the simulation device) 10 according to a preferred embodiment of the present invention. Simulation device 10 carries out a simulation of a robot 12 (normally, offline) by positioning three-dimensional models of robot 12 and a peripheral object 14 such as external equipment arranged about robot 12 in the same virtual space. Simulation device 10 includes: a motion path obtaining part 16 which obtains a first motion path of robot 12 by executing a simulation of a predetermined motion program of robot 12; a teaching point specifying part 18 which detects whether interference between robot 12 and peripheral object 14 occurs when robot 12 is moved along the first motion path, and specifies a first teaching point (hereinafter, also referred to as a start point) corresponding to a teaching point immediately before the interference occurs and a second teaching point (hereinafter, also referred to as an end point) corresponding to a teaching point immediately after the interference occurs; a motion path generating part 20 which automatically adds or inserts at least one third teaching point between the first and second teaching points and generates different second motion paths by which the interference between the robot and the peripheral object does not occur, the third teaching point being separated from the first or second teaching point in a search direction determined by a random number by a search distance determined by a random number; an evaluating part 22 which evaluates each of the second motion paths based on at least one previously determined parameter; and a motion path selecting part 24 which selects an optimum motion path of robot 12 from the second motion paths based on an evaluation result by evaluating part 22.

Optionally, simulation device 10 may include a displaying part 26 which displays the virtual space, etc., where the three-dimensional models of robot 12 and peripheral object 14 are located, a teaching point deleting part 28 which deletes a surplus teaching point from the third teaching point, and a teaching point adjusting part 30 which adjusts the position of the third teaching point. The functions of deleting part 28 and adjusting part 30 are explained below.

Figure 2:
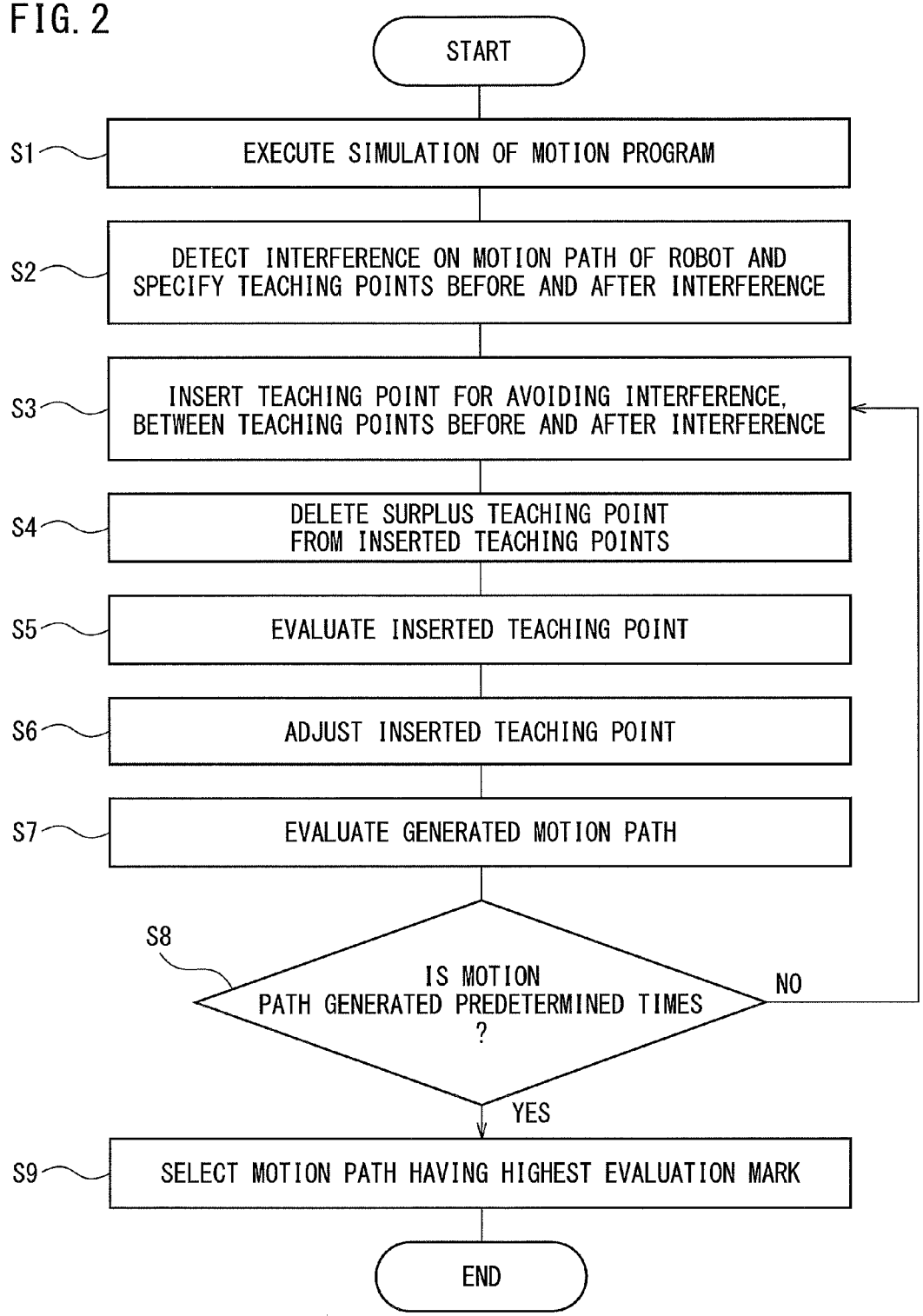
FIG. 2 is a flowchart showing an example of a procedure in the robot simulation device of the invention.
Figure 3:
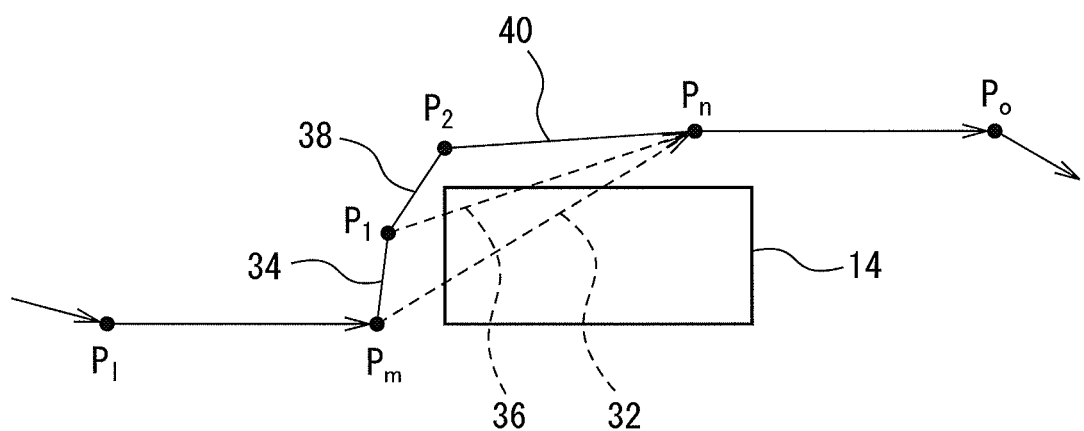
FIG. 3 explains an example for generating an intermediate teaching point for avoiding interference.

Next, with reference to FIGS. 2 and 3, the procedure in simulation device 10 is explained. First, in step S1, the simulation of the motion program previously prepared for robot 12 is executed so as to obtain first motion path 32 of robot 12. The first motion path includes a plurality of teaching points for specifying the position and orientation of a representative point (for example, a tool center point) of robot 12 based on the motion program. In the first motion path, the interference between robot 12 and peripheral object 14 is not considered.

In the next step S2, it is detected whether the interference between robot 12 and peripheral object 14 occurs when robot 12 is moved along the first motion path. Then, when the interference occurs, the first teaching point (or the start point) corresponding to a teaching point immediately before the interference occurs and the second teaching point (or the end point) corresponding to a teaching point immediately after the interference occurs, are specified. In the example of FIG. 3, since the interference occurs between teaching points Pm and Pn included in first motion path 32, teaching point Pm and teaching point Pn are specified as the start point and the end point, respectively.

In the next step S3, at least one third teaching point is automatically added between start point Pm and end point Pn so as to generate a second motion path 34 by which the interference between robot 12 and peripheral object 14 does not occur, the third teaching point being separated from point Pm or Pn in a search direction determined by a random number by a search distance determined by a random number. In the example of FIG. 3, it is detected whether the interference between robot 12 and peripheral object 14 occurs when robot 12 is moved along a motion path 34 extending from start point Pm to an intermediate teaching point P1 which is separated from start point Pm in a search direction determined by a random number by a search distance determined by a random number. Since the interference does not occur in motion path 34, intermediated teaching point P1 is inserted between start point Pm and end point Pn. To the contrary, when the interference occurs in motion path 34, intermediate teaching point P1 is discarded and another intermediate teaching point is searched.

Next, it is detected whether the interference between robot 12 and peripheral object 14 occurs when the robot is moved along a motion path 36 extending from the lastly inserted intermediate teaching point (in this case, point P1) to end point Pn. In the illustrated example, since the interference occurs in motion path 36, a new intermediate teaching point P2, which is separated from intermediate teaching point P1 in a search direction determined by a random number by a search distance determined by a random number, is calculated, and then, it is detected whether the interference occurs in a motion path 38 between intermediate teaching points P1 and P2. Since the interference does not occur in motion path 38, intermediated teaching point P2 is inserted between intermediate teaching point P1 and end point Pn. On the contrary, when the interference occurs in motion path 38, intermediate teaching point P2 is discarded and another intermediate teaching point is searched. In addition, when a motion path by which the interference does not occur is not obtained even after search of point P2 is repeated a predetermined number of times, point P1 is discarded and point P1 is searched again.

The above procedure is repeated until the interference does not occur. In the illustrated example, since the interference does not occur in a motion path 40 extending from the lastly inserted intermediate teaching point (in this case, point P2) to end point Pn, a motion path from start point Pm to end point Pn via intermediate teaching points P1 and P2 (i.e., a path including motion paths 34, 38 and 40) is generated as the second motion path by which the interference does not occur. In addition, the movement of the robot based on the search direction and the search distance determined by a random number is not limited to translational movement, and may include rotational movement.

As explained above, in the present invention, since the search direction and the search distance for calculating the intermediate teaching point are randomly determined by using a random number, arithmetic processing is not trapped in an endless loop, nor outputs a local solution, whereby an interference avoiding path can be obtained. Further, by using the random number, the motion path can be generated without depending on the level of skill of the operator. In this regard, in order to more effectively generated the second motion path, the random number for determining the movement direction of the robot may be determined as below.

(i) As for the direction of translational movement of the robot, an initial state may be set, wherein a probability that a random number for determining the search direction, by which the robot approaches the end point (i.e., the distance between the intermediate teaching point and the end point is smaller than the distance between the start point and the end point), is selected, is higher than a probability that a random number for determining the search direction, by which the robot is away from the end point (i.e., the distance between the intermediate teaching point and the end point is larger than the distance between the start point and the end point), is selected.

(ii) As for the new position (or the intermediate teaching point), the search direction (the direction of movement) of which is determined by a random number, a probability that the search direction, by which interference between the robot and the peripheral object occurs between the new position and the immediately before teaching point on the motion path, is selected in the next or later search, is set to be higher than a probability that the search direction, by which the interference occurs, is selected in the next or later search. In this regard, it is preferable that a lower limit of the probability be predetermined so as to prevent the search direction by which the interference occurs from being never selected in the later procedure.

By means of at least one of the above items (i) and (ii), the motion path of the robot (the second motion path), by which the interference does not occur, may be obtained with a smaller number of trials.

In the second motion path generated in step S3, the third teaching points may include a surplus teaching point, such as a plurality of consecutive points having the same movement direction, a teaching point having the movement direction opposite to the immediately before teaching point, and a teaching point returning to the previous teaching point after passing through some teaching points, etc. Therefore, in step S4, such a surplus teaching point is deleted from the inserted or added intermediate teaching points as the third teaching points. Concretely, first, when the second motion path is to be generated, the movement direction and the movement distance of each third teaching point are stored in a suitable memory, etc. Next, the movement directions of two consecutive third teaching points on the second motion path are compared. If the movement directions are the same, then a new teaching point obtained by adding the movement distances of the two teaching points is inserted, and the two consecutive third teaching points are deleted. In other words, the two consecutive third teaching points are combined into one new teaching point.

On the other hand, if the movement directions of two consecutive third teaching points on the second motion path are opposed to each other, then a new teaching point obtained by canceling the movement distances of the two teaching points each other is inserted, and the two consecutive third teaching points are deleted. In other words, also in this case, the two consecutive third teaching points are combined into one new teaching point. In this regard, if the movement directions of the two teaching points are opposed to each other and the movement distance thereof are the same, the robot is returned to the previous position after passing through the two teaching points. In such a case, the two teaching points may be merely deleted.

In addition, when the robot does not interfere with the peripheral object on a motion path (normally, a straight line) between arbitrarily selected two inconsecutive teaching points, all of teaching points between the two inconsecutive teaching points may be deleted.

By virtue of the above procedure, the surplus teaching point can be deleted from the third teaching points, whereby a more simple motion path of the robot may be obtained. In addition, step S4 is optional, since the second motion path may not include the surplus teaching point.

As explained above, the second motion path may be generated without depending on the level of skill of the operator, whereas the second motion path may include obviously unnecessary movement of the robot. Therefore, a simulation is executed in which the robot is moved along each of the obtained second motion paths, and each third teaching point included in the second motion path is evaluated by means of evaluating part 22 based on a predetermined parameter (step S5). Then, a teaching point having a relatively low evaluation value (in particular, a teaching point having the lowest evaluation value) is adjusted so as to increase the evaluation value thereof (step S6). By repeating such procedure, the second motion path may be more practical.

As the parameter (or evaluation item) for calculating the above evaluation value, following parameters may be used, for example. The following parameters may be calculated or estimated by executing the simulation along the second motion path.

(a) a motion time of the robot
(b) a minimum distance between the robot and the peripheral object
(c) an amount of heat generation of a motor for driving the robot
(d) a lifetime of a speed reducer of the robot
(e) a consumed power of the robot By using at least one of the above parameters, the evaluation value of each teaching point can be obtained based on the following criteria. Further, by integrating the evaluation values of the teaching points included in the same motion path, a total evaluation value of the motion path can be obtained.

(a) The motion time of the robot is calculated, and the shorter the motion time is, the higher the evaluation value is.
(b) The minimum distance between the robot and the peripheral object is calculated, and the longer the minimum distance is, the higher the evaluation value is.
(c) The amount of heat generation of the motor for driving the robot is estimated, and the smaller the amount of heat generation is, the higher the evaluation value is.
(d) The lifetime of the speed reducer of the robot is estimated, and the longer the lifetime is, the higher the evaluation value is.
(e) The consumed power of the robot, and the smaller the consumed power is, the higher the evaluation value is.

Regarding above parameter (b), when the distance between the robot and the peripheral object is too short, the interference easily occurs between the actual robot and the actual peripheral object. On the other hand, when the distance therebetween is too long, the evaluation value regarding the other parameters tends to be decreased. Therefore, in relation to parameter (b), a proper distance between the robot and the peripheral object may be predetermined (for example, 5 cm to 10 cm), and the evaluation value may be increased as a difference between the proper distance and the minimum distance is decreased. Alternatively or additionally, an upper limit of the distance between the robot and the peripheral object may be predetermined (for example, 50 cm to 100 cm), and the evaluation value may be constant when the minimum distance exceeds the upper limit.

However, two or more of above parameters (a) to (e) can be used to calculate the evaluation value. In this case, it is preferable to previously classify the weight of each parameter, and to calculate the evaluation value based on the weighting.

As a method for adjusting the third teaching point in step S6, the position of the teaching point may be changed. Concretely, the position of the teaching point to be adjusted (i.e., the teaching point having the low or minimum evaluation value) is moved by a small distance so as to obtain a motion path of the robot between the moved teaching point and teaching points before/after the moved teaching points. When the interference between the robot and the peripheral object does not occur on the obtained motion path, the evaluation value of the new (moved) teaching point is calculated. This procedure is repeated a predetermined number of times within a predetermined acceptable range (for example, a region in which the teaching points before/after the moved teaching points are not included), and the position having the highest evaluation value is determined as the position of an adjusted teaching point. In this regard, the above "small distance" may be properly determined depending on the application of the robot and/or the distance between each teaching point, etc. For example, the acceptable range may be divided into a plurality of meshes, the length of each side of each mesh being 1 mm to 5 mm, and the teaching point may be moved into each mesh.

Otherwise, the procedure for obtaining the evaluation value of the total motion path of the may be repeated, while obtaining the motion path of the robot by which the interference does not occur, deleting the surplus teaching point, and adjusting the teaching point. Then, by selecting the motion path having the highest evaluation value, a more practical motion path may be obtained. In this case, the above procedure may be repeated a predetermined number of times, or may be repeated until the evaluation value reaches a predetermined value. In addition, steps S5 and S6 are optional.

In the next step S7, the evaluation value of the generated second motion path is calculated. The evaluation value of the motion path can be calculated by integrating the evaluation values of the teaching points included in the motion path.

In the next step S8, it is judged whether the generation of the second motion path is repeated a predetermined number of times. Although at least two second motion paths are generated, it is preferable that as many motion paths be generated as possible, in view of an arithmetic capacity of the simulation device, etc.

Finally, in step S9, among the generated second motion paths, one motion path having high (normally, the highest) evaluation value is selected as an optimum motion path (or an interference avoiding path) of the robot. As such, a practical interference avoiding path of the robot can be automatically generated without depending on the level of skill of the operator.

In addition, in generating the second motion path, when the distance between the start point and end point is relatively long, or when the start and end point are positioned in recessed portions of different peripheral objects, etc., an interference avoiding path from the start point to the end point may not be generated even if the method for determining the search direction and the search distance by using a random number is repeated a practical number of times. Hereinafter, a method for generating the interference avoiding path (or the second motion path) in such a case will be explained.

Figure 4:
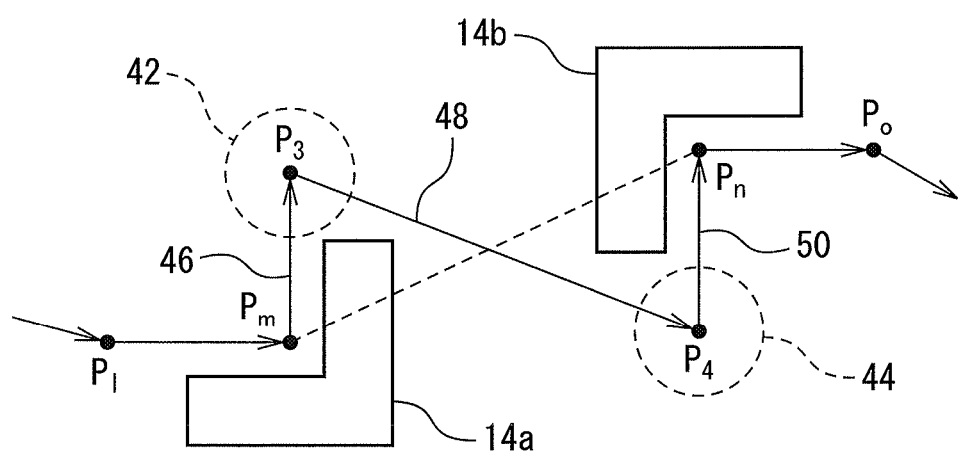
FIG. 4 explains an example in which a relay teaching point is inserted into a second motion path.

FIG. 4 shows an example in which start point Pm and end point Pn are positioned in recessed portions of peripheral objects 14a and 14b, respectively. In this case, the second motion path may not be generated even if the method for determining the search direction and the search distance by using a random number is repeated a practical number of times. Then, first, in the vicinity of start point Pm, a first relay teaching point P3 is generated, by which the robot does not interfere with the peripheral object even when the robot is moved from point P3 in any direction by a certain distance. Similarly, in the vicinity of start point Pn, a second relay teaching point P4 is generated, by which the robot does not interfere with the peripheral object even when the robot is moved from point P4 in any direction by a certain distance.

For example, a concrete method for generating first relay teaching point P3 includes the following steps of:

(i) generate a new position which is separate from start point Pm in a direction toward the origin position of the robot by an arbitrary distance;

(ii) move the robot by a small distance within a designated acceptable range (for example, a circle 42 having a diameter of 5 cm to 10 cm) about the new position, and detect the interference between the robot and the peripheral object; and (iii) repeat (i) and (ii) until the robot does not interfere with the peripheral object. Similarly, for example, a concrete method for generating second relay teaching point P4 includes following steps of:

(iv) generate a new position which is separate from end point Pn in a direction toward the origin position of the robot by an arbitrary distance;

(v) move the robot by a small distance within a designated acceptable range (for example, a circle 44 having a diameter of 5 cm to 10 cm) about the new position, and detect the interference between the robot and the peripheral object; and (vi) repeat (iv) and (v) until the robot does not interfere with the peripheral object.

Next, due to the similar procedure, motion paths 46, 48 and 50, by which the robot does not interfere with the peripheral object (or interference avoiding paths) are generated in relation to between start point Pm and relay point P3 in the vicinity of the start point, between relay points P3 and P4, and between end point Pn and relay point P4 in the vicinity of the end point, respectively. Then, by combining motion paths 46 and 48, and by combining motion paths 48 and 50, the second motion path can be generated between start point Pm and end point Pn, by which the robot does not interfere with the peripheral object.

In addition, when the motion path for avoiding interference between the robot and the peripheral object cannot be generated even if the relay point generated by the above procedure is used, the movement direction for generating the new position may be changed in at least one of above steps (i) and (iv). For example, in FIG. 4, the movement direction from start point Pm to relay point P3 and the movement direction from end point Pn to relay point P4 are opposed to each other.

Figure 5:
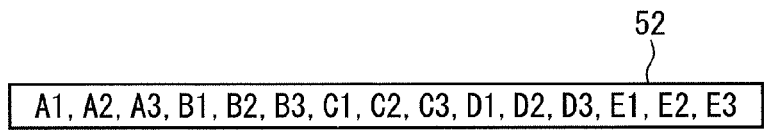
FIG. 5 shows an example of a row of teaching points included in a robot motion path before an interference avoiding path is generated.
Figure 6:
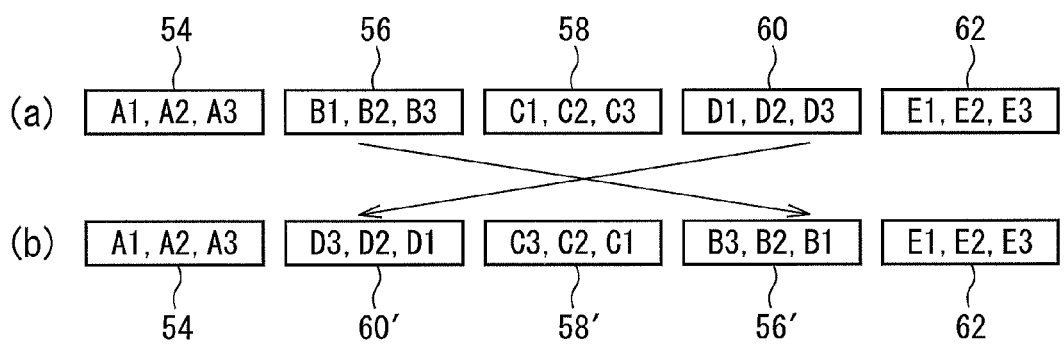
FIG. 6 shows an example in which the row of teaching points as shown in FIG. 5 are divided into a plurality of blocks, an order of some blocks is changed, and an order of the teaching points in each of some blocks is reversed.
Figure 7:
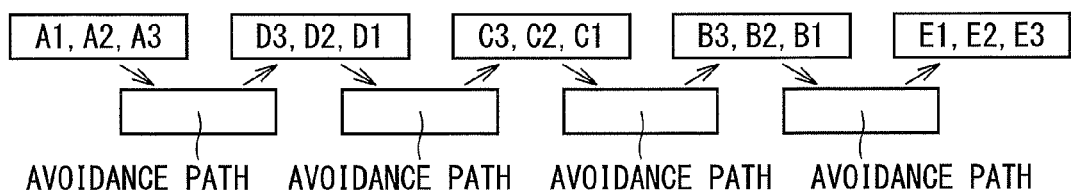
FIG. 7 shows an example in which an interference avoiding path is inserted into the row of teaching points as shown in FIG. 6.

FIGS. 5 to 7 show an example, as an application of the invention, in which teaching points are divided into a plurality of blocks and an interference avoiding path is generated, when the interference occurs at a plurality of positions. In this case, as shown in FIG. 5, first motion path 52 obtained by the simulation of the motion program includes teaching points A1, A2, A3, B1, B2, B3, C1, C2, C3, D1, D2, D3, E1, E2 and E3, in this order. Further, the robot may interfere with the peripheral object at four positions, i.e., between teaching points A3 and B1, between teaching points B3 and C1, between teaching points C3 and D1, and between teaching points D3 and E.

Also in the example of FIG. 5, an interference avoiding path may be generated by inserting respective third teaching points at the four positions, according to the procedure as explained above. However, another interference avoiding path having a higher evaluation value may be generated, by dividing teaching points into a plurality of blocks with reference to a boundary where the interference occurs, and by changing the order of the blocks and/or reversing the order of teaching points in each block.

Concretely, as shown in section (a) of FIG. 6, first, teaching points are divided into five blocks, i.e., a first block 54 including teaching points A1, A2, A3; a second block 56 including teaching points B1, B2, B3; a third block 58 including teaching points C1, C2, C3; a fourth block 60 including teaching points D1, D2, D3; and a fifth block 62 including teaching points E1, E2, E3.

Next, two arbitrary blocks are selected from the blocks obtained by dividing first motion path 52. In this case, second block 56 and fourth block 60 are selected. Then, the order of the selected blocks (including the block therebetween) is changed. In other words, as shown in section (b) of FIG. 6, the order of the five blocks is changed as follows:

first block->fourth block->third block->second block->fifth block

Optionally, the teaching point in each block may be reversed. In the illustrated example, the order of the teaching points in each of the second, third and fourth blocks is reversed, whereby second block 56', third block 58' and fourth block 60' are formed. In other words, in section (b) of FIG. 6, the order of teaching points from B1 to D3 is reversed.

In the configuration of the blocks in section (b) of FIG. 6, an interference avoiding path is generated, according to the method as explained above, in which the last teaching point in each block is determined as the start point, and the first teaching point in the subsequent block is determined the end point. By virtue of this, a second motion path from teaching point A1 to teaching point E3, as shown in FIG. 7.

By repeatedly changing the order of the blocks or reversing the order of the teaching points in each block, an optimum motion path can be obtained. Concretely, it is preferable to use an annealing method for obtaining the optimum motion path, as follows. First, after a motion path by which the robot does not interference with the peripheral object is obtained, a first evaluation value of the obtained motion path is calculated according to the procedure as explained above. Next, a second evaluation value is also calculated, in relation to a motion path after the order of the blocks is changed or the order of the teaching points in each block is reversed. When the second evaluation value is larger than the first evaluation value, the latter result (or the motion path having the second evaluation value) is used. In addition, even when the second evaluation value is smaller than the first evaluation value, the latter result is used when the difference between the first and second evaluation value is within a predetermined reference value.

By repeating the above comparison of the evaluation values while the reference value is sufficiently gradually decreased, a motion path having a higher evaluation value can be obtained without falling into a local solution. In addition, the interference avoiding path inserted between the blocks may be stored in a suitable memory. By using the stored interference avoiding path when inserting an interference avoiding path between the same blocks in the later procedure, the calculation time may be reduced.

The robot simulation device according to the present invention may be incorporated in a robot controller for controlling an actual robot to be simulated. In other words, the robot controller may have the function of the robot simulation device. When the robot controller stores information regarding the shapes of the robot and the peripheral object and the placement positions thereof, the robot controller may generate the interference avoiding path as described above. Further, by virtue of this, the actual robot can be more smoothly operated based on the result of the simulation.

According to the present invention, by generating the third teaching point for avoiding interference by using a random number, the interference avoiding path can be obtained with a high probability without falling into a local solution. Further, since the interference avoiding path is automatically generated, a practical path of the robot for avoiding interference can be generated, without depending on the level of skill of the operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot simulation device for simulating motion of a robot and controlling the robot based on a simulation of a motion program of the robot, comprising:
 a robot controller for carrying out the simulation of the robot by positioning three-dimensional models of the robot and a peripheral object arranged about the robot in a same virtual space, the robot controller configured to:
  obtain a first motion path of the robot by executing the simulation of the motion program of the robot;
  detect whether interference between the robot and the peripheral object occurs when the robot is moved along the first motion path, and specify a first teaching point corresponding to a teaching point immediately before the interference occurs and a second teaching point corresponding to a teaching point immediately after the interference occurs;
  add at least one third teaching point between the first and second teaching points and generates different second motion paths by which the interference between the robot and the peripheral object does not occur, the at least one third teaching point being separated from the first or second teaching point in a search direction determined by a first random number and a search distance determined by a second random number;
  evaluate each of the second motion paths based on at least one previously determined parameter including a motion time of the robot and a minimum distance between the robot and the peripheral object;
  select an optimum motion path of the robot from the second motion paths based on an evaluation result; and
  control the robot based on the simulation, such that the robot is controlled to move along the selected optimum motion path.

2. The robot simulation device as set forth in claim 1, wherein the robot controller detects whether the interference between the robot and the peripheral object occurs when the robot is moved along a motion path from the first teaching point to the at least one third teaching point separated from the first teaching point in a search direction determined by the first random number by a search distance determined by the second random number, and inserts the at least one third teaching point between the first and second teaching points when the interference does not occur; and
 wherein the robot controller detects whether the interference between the robot and the peripheral object occurs when the robot is moved along a motion path from the lastly inserted third teaching point to the second teaching point, and generates the second motion path by repeating a process for inserting a newly one third teaching point separated from the lastly inserted third teaching point in a search direction determined by the first random number by a search distance determined by the second random number, until the interference does not occur.

3. The robot simulation device as set forth in claim 2, wherein the robot controller has at least one of functions to:
 set an initial state in which a probability that the first random number for determining the search direction, by which a distance between the at least one third teaching point and the second teaching point is smaller than a distance between the first teaching point and the second teaching point, is higher than a probability that the first random number for determining the search direction, by which the distance between the third teaching point and the second teaching point is larger than the distance between the first teaching point and the second teaching point; and
 detect whether the interference between the robot and the peripheral object occurs in the motion path from the first teaching point to the at least one third teaching point, and make a setting in which a probability that a search direction by which the interference does not occur is selected in a next or later searching is higher than a probability that a search direction by which the interference occurs is selected in the next or later searching.

4. The robot simulation device as set forth in claim 2, wherein the robot controller is further configured to delete a surplus teaching point from the at least one third teaching point, wherein the robot controller has at least one of functions to:
 store a movement direction and a movement distance of each of the inserted third teaching points, and, when the movement directions of two consecutive third teaching points on the second motion path are the same, then combine the two consecutive third teaching points into one new teaching point by adding the movement distances of the two consecutive third teaching points;
 when movement directions and movement distances of two consecutive third teaching points on the second motion path are opposed to each other, combine the two consecutive third teaching points into one new teaching point or delete the two consecutive third teaching points by canceling the movement distances of the two consecutive third teaching points; and
 detect whether the interference between the robot and the peripheral object in relation to a path connecting two arbitrary inconsecutive third teaching points on the second motion path, and, when the interference does not occur, delete a teaching point between the two arbitrary inconsecutive third teaching points.

5. The robot simulation device as set forth in claim 1, wherein the at least one parameter includes:
(a) the motion time of the robot;
(b) the minimum distance between the robot and the peripheral object;
(c) an amount of heat generation of a motor for driving the robot;
(d) a lifetime of a speed reducer of the robot; and
(e) a consumed power of the robot,
and wherein the robot controller selects a plurality of arbitrary parameters including at least parameters (a) and (b) among the parameters (a) to (e) when simulating the second motion path, and calculates an evaluation value by previously weighting the selected arbitrary parameters.

6. The robot simulation device as set forth in claim 1 wherein the robot controller adjusts a position of the at least one third teaching point, wherein the robot controller is configured to:
evaluate each third teaching point included in the second motion path based on the at least one previously determined parameter;
repeatedly carry out a process for moving the position of the third teaching point to be adjusted by a small distance within a predetermined acceptable range and detecting whether the interference between the robot and the peripheral object occurs; and
set a third teaching point having the highest evaluation mark among the third teaching points within the predetermined acceptable range as an adjusted position of the third teaching point.

7. The robot simulation device as set forth in claim 1, wherein the robot controller is configured to:
generate a first relay teaching point in a vicinity of the first teaching point, where the robot does not interfere with the peripheral object even when the robot is moved by a predetermined distance in any direction;
generate a second relay teaching point in a vicinity of the second teaching point, where the robot does not interfere with the peripheral object even when the robot is moved by a predetermined distance in any direction; and
generate motion paths between the first teaching point and the first relay teaching point, between the first relay teaching point and the second relay teaching point, and between the second relay teaching point and the second teaching point, respectively, by which the robot does not interfere with the peripheral object.

8. The robot simulation device as set forth in claim 1, wherein the robot controller is configured to:
generate a plurality of blocks by dividing a plurality of teaching points included in the first motion path at a position where the interference between the robot and the peripheral object occurs;
change an order of at least two of the blocks and/or reverse an order of the teaching points included in each block; and
automatically generate a motion path between a last teaching point in the block and a leading teaching point in a subsequent block, by which the robot does not interfere with the peripheral object.

* * * * *